United States Patent [19]

Röhrle

[11] Patent Number: 5,435,783
[45] Date of Patent: Jul. 25, 1995

[54] TORSION DAMPER, ESPECIALLY FOR A MOTOR VEHICLE

[75] Inventor: Dieter Röhrle, Montmorency, France

[73] Assignee: Valeo, Paris, France

[21] Appl. No.: 162,618

[22] Filed: Dec. 7, 1993

[30] Foreign Application Priority Data

Dec. 8, 1992 [FR] France ................................ 92 14762

[51] Int. Cl.⁶ .................................................. F16D 3/12
[52] U.S. Cl. ................................... 464/068; 464/66; 74/574; 74/573 R; 74/573 F; 192/106.2
[58] Field of Search ...................... 464/66, 68; 74/574, 74/573 R, 573 F; 192/106.2

[56] References Cited

FOREIGN PATENT DOCUMENTS

| | | |
|---|---|---|
| 3624496 | 1/1988 | Germany . |
| 3721712 | 1/1988 | Germany . |
| 3841639 | 12/1989 | Germany . |
| 3931429 | 4/1990 | Germany . |
| 2217429 | 10/1989 | United Kingdom . |

Primary Examiner—Rodney H. Bonck
Assistant Examiner—David Fenstermacher
Attorney, Agent, or Firm—Longacre & White

[57] ABSTRACT

A torsion damper, especially for a motor vehicle, comprises coaxial primary and secondary parts mounted for relative rotation or one with respect to the other. A circumferentially acting resilient element, at least partially mounted within a cavity formed in a sealing element, acts between the primary and secondary parts via a torque limiter. The torque limiter comprises a damper plate fixed with respect to one of the primary and secondary parts, and two counter plates secured together with suitable fasteners. The two counter plates frictionally embrace the damper plate, and the sealing element is secured to the counter plates by the fasteners.

6 Claims, 1 Drawing Sheet

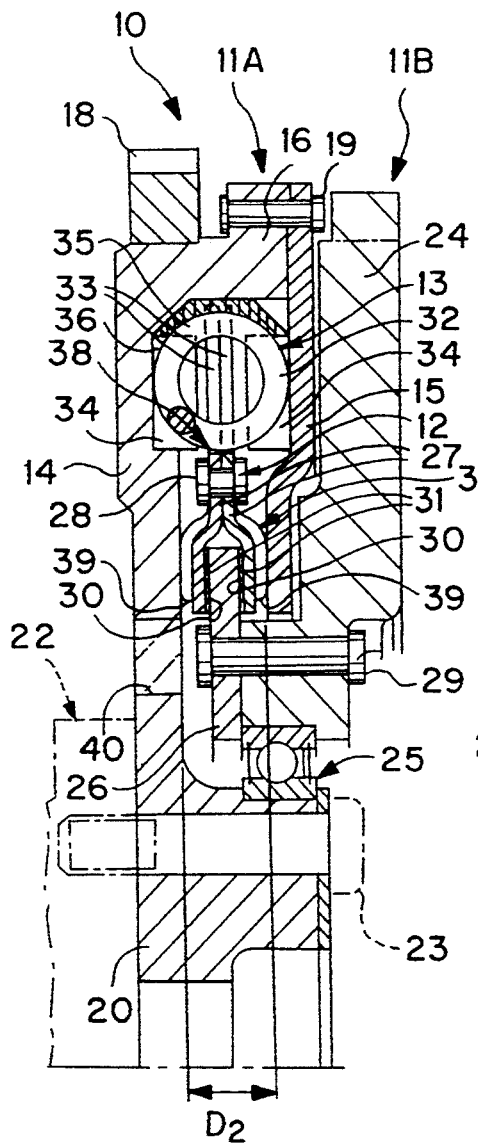
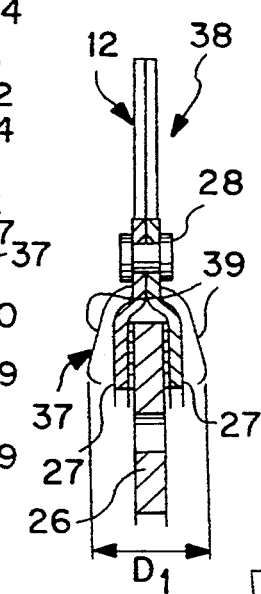
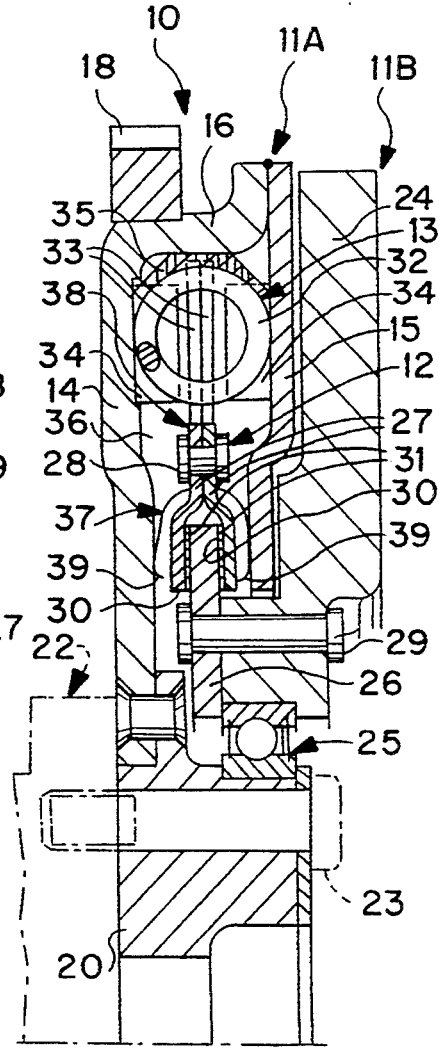
FIG. 1
FIG. 2
FIG. 3

1

TORSION DAMPER, ESPECIALLY FOR A MOTOR VEHICLE

FIELD OF THE INVENTION

This invention is concerned, in general terms, with torsion dampers, especially though not exclusively for motor vehicles, and being of the kind comprising a primary part and a secondary part, mounted coaxially with each other for rotation with respect to each other, together with circumferentially acting resilient means acting between the two said coaxial parts. More particularly, the invention is directed to a torsion damper in which the said circumferentially acting resilient means act through a torque limiter, and are mounted within a cavity which is adapted to hold a quantity of grease around the said resilient means for the purpose of limiting parasitic friction which may be generated by the resilient means, by lubrication of the latter.

BACKGROUND OF THE INVENTION

In the specification of German published patent application DE 3 931 429A, this cavity, which is mainly defined by the primary coaxial part, is closed by centering means which are also arranged to act between the primary and secondary coaxial parts. As a result, since the torque limiter is also arranged within the Same cavity, the torque limiter is also lubricated by the grease, and this is detrimental to its torque limiting action. Another consequence of this arrangement is that, since the torque limiter gives rise to wear products, these wear products will inevitably contaminate the grease in the cavity, thus impairing its lubricating qualities.

In the specification of German published patent application DE 3 624 496A, the cavity in which the circumferentially acting resilient means are fitted is at least partly defined by a sealing means which includes either one or two thin rings, which, being suitably profiled, closely surround the circumferentially acting resilient means. These sealing rings make it necessary to provide special securing means, which in practice consist of welds, for attaching them to either one of the two coaxial parts. The assembly together of the various components of this arrangement is consequently somewhat complex, and this increases manufacturing costs.

DISCUSSION OF THE INVENTION

An object of the invention is to provide a torsion damper which does not have the drawbacks mentioned above, and which has further advantages in addition.

According to the invention, a torsion damper, especially for a motor vehicle, of the kind comprising two coaxial parts, namely a primary coaxial part and a secondary coaxial part respectively, which are mounted for relative rotation of one with respect to the other, with circumferentially acting resilient means working between the said coaxial parts via an interposed torque limiter, the said resilient means being mounted in a cavity which is at least partly defined by a sealing means, wherein the torque limiter and the sealing means are both part of a common unitary sub-assembly, is characterised in that the torque limiter includes a damper plate which is fixed with respect to one of the said coaxial parts, together with two counter plates which are secured to each other by fastening means, and which embrace the said damper plate in frictional relationship with the latter, and in that the said sealing means is secured to the counter plates by the same fastening means which secure the latter together.

Thus, the fastening of the sealing means can be carried out, with advantage, without additional manufacturing costs. This arrangement is very simple to assemble, thus reducing these costs.

Preferably, the sealing means comprises at least one resiliently deformable ring, which is secured to the counter plates along one of its peripheries, and which is cantilevered from one of the counter plates lengthwise of the other. This greatly simplifies manufacture and assembly. In particular, the resiliently deformable ring or rings constituting the sealing means in the torsion damper according to the invention have a simple configuration and a reduced size in the radial direction.

Preferably, the friction surfaces of the torque limiter lie outside the cavity in which the circumferentially acting resilient means are located. With this arrangement, the friction surfaces are not liable to come in contact with the grease present in the cavity, and the grease is not liable to be contaminated by wear products from the torque limiter.

The various features and advantages of the invention will appear more clearly on a reading of the detailed description which follows, of preferred embodiments of the invention, the description being given by way of example only and with reference to the accompanying diagrammatic drawings.

BRIEF DESCRIPTION OF THE DRAWINGS

FIG. 1 is a half view in axial cross section showing a torsion damper in accordance with the invention.

FIG. 2 on the same scale as FIG. 1, is a half view in axial cross section of the unitary torque limiter and sealing sub-assembly which is part of the same torsion damper.

FIG. 3 is a half view in axial cross section similar to FIG. 1, but showing a modified version of the torsion damper.

DESCRIPTION OF PREFERRED EMBODIMENTS OF THE INVENTION

As shown in the drawings, and in a manner which is generally already known, the torsion damper 10 comprises two parts 11A, 11B coaxial with each other, namely a primary coaxial part and a secondary coaxial part respectively. These coaxial parts are mounted for relative rotation of one with respect to the other, and the torsion damper also includes circumferentially acting resilient means 13 which are mounted so as to act between the two coaxial parts 11A and 11B through a torque limiter 12.

In this example the primary coaxial part 11A comprises two radial plates 14 and 15, together with an enclosing and spacing element 16 arranged at the outer periphery, i.e. the periphery of greatest diameter, of the radial plates 14 and 15. In this example the spacing element 16 is integral with the radial plate 14, while the plate 15 is secured at its own outer periphery, i.e. that having the greater diameter, to the spacing element 16 (or flange). The radial plate 15 carries, in this embodiment, an external starter crown 18. In FIG. 1 the radial plate 15 is secured to the spacing flange 16 by means of rivets 19 which are arranged in a spaced relationship along a common pitch circle.

The primary coaxial part 11A also includes a hub 20, at the inner periphery, i.e. that having the smaller diameter, of the radial plate 14. It is through the hub 20 that the assembly can be carried at the end of a shaft 22 by means of studs 23. In the present example, the torsion damper 10 is intended for use in a motor vehicle, and the shaft 22 is the crankshaft of the internal combustion engine of the vehicle. It will also be noted that in FIG. 1, the hub 20 is integral with the radial plate 14.

The secondary coaxial part 11B in this embodiment comprises a plate 24 which is outside the primary coaxial part 11A. The plate 24 extends radially inwards to the hub 20, but with centring means 25 arranged between the plate 24 and the hub 20. The centring means 25 in this example consist of a roller bearing. This plate 24 in the present embodiment is the reaction plate of a clutch, having a friction disc (not shown) which is mounted on the input shaft of the gearbox of the vehicle, for rotation with the input shaft.

The torque limiter 12 extends between the radial plates 14 and 15 of the primary coaxial part 11A, and it consists of, firstly, a damper plate 26 which is secured to one of the two coaxial parts 11A, 11B, and secondly two counter plates 27 arranged so as to enclose the damper plate 26 between them. The counter plates 27 are secured together by suitable fastening or securing means 28, and are in frictional contact with the damper plate 26. The damper plate 26 in this example is fixed to the secondary coaxial part 11B, by means of rivets 29 securing it to the plate 24 at the inner periphery of the latter.

The frictional contact between the damper plate 26 and the two counter plates 27 on either side of it is provided by friction surfaces 30 in the region of the outer periphery of the damper plate 26; and it will be noted from FIG. 2 that the counter plates merge toward one another so that they are abutted together radially outwardly of the damper plate 26. In this example, friction rings 31 are arranged between the friction surfaces 30 of the counter plates 27, and the damper plate 26, while the fastening means 28 which secure the counter plates 27 together are in the form of rivets arranged in spaced relationship along a common pitch circle. The friction rings 31 may for example be adhesively bonded either on to the damper plate 26 or on to the counter plates 27. However, in a modification they are free.

In the arrangement shown, the circumferentially acting resilient means 13 are in the form of a plurality of springs 32 of the coil spring type, which are elongated in the circumferential direction and which act circumferentially between, firstly, arms 33 defined radially by the counter plates 27 of the torque limiter 12, radially outwardly of their fastening means 28, and secondly a set of projecting elements 34 which are carried for this purpose by the radial plates 14 and 15 of the primary coaxial part 11A. Also in this example, inserts 35 are interposed radially from place to place between the springs 32 and the spacing flange 16. Thus the springs 32 are arranged in a cavity 36 which is defined in the primary coaxial part 11A, essentially by the radial plates 14, 15 and the spacing flange 16. This cavity 36 is however also defined partly by a sealing arrangement, or seal, 37 which is arranged beside the inner periphery (i.e. that having the smaller diameter) of the radial plates 14 and 15.

The torque limiter 12 and the seal 37 in this embodiment together constitute a unitary sub-assembly 38 which is shown by itself in FIG. 2. As shown in FIG. 2, the seal 37 is fastened to the counter plates 27 or the torque limiter 12 by the same fastening means 28 as those which secure the two counter plates 27 together. The seal 37 comprises at least one resiliently deformable ring 39, which is cantilevered from one of these counter plates 27, generally lengthwise with respect to the other counter plate, and which is of course secured by the fastening means 28 to the counter plates 27. The elastic rings 39 are divergent from each other in a generally oblique manner as shown, away from the fastening means 28 securing them to the counter plates 27; and the friction surfaces 30 of the counter plates 27 thus lie outside the cavity 36 in which the circumferentially acting resilient means 13 are mounted. The elastic rings 39 may for example be made of thin sheet metal.

FIG. 2 shows the sub-assembly in its rest or relaxed position, in which the distance D1 which separates the free ends of the elastic rings 39 is greater than the distance D2 (see FIG. 1) between the two radial plates 14 and 15 of the primary coaxial part 11A. After the sub-assembly 38 has been fitted, the elastic rings 39 are deformed inwardly as shown in FIG. 1, so that they bear resiliently against the two radial plates 14 and 15 respectively. In other words they are compressed or prestressed, thus ensuring the effective sealing of the cavity 36. The friction rings 31 are then isolated from the cavity 36 by the resilient sealing rings 39, and wear products that may be produced by the friction rings 31 cannot then contaminate the grease which is present in the cavity 36.

Preferably (and as shown in the drawings), the free ends of the resilient sealing rings 39 are rounded, being directed obliquely inwardly towards the damper plate 26, so as to protect the radial plates 14 and 15 from contact with the free terminal edges of the sealing rings.

Fitting of the torsion damper 10 described above may for example be carried out by either one of the two methods described below.

When, as shown in full lines in FIG. 1, the reaction plate 24 forming part of the secondary coaxial part 11B covers (at its outer periphery) the rivets 19 of the primary coaxial part 11A, the initial step in the assembly method is to fit axially on to the radial plate 14 of the primary coaxial part 11A the unitary sub-assembly 38 which comprises the torque limiter 12 and the seal 37, the springs 32, and the radial plate 15 of the primary coaxial part 11A, before the radial plate 15 is secured to the spacing flange 16 by means of the rivets 19.

The second step is to position the plates 24 of the secondary coaxial part 11B and the centring means 25, the plate 24 being finally secured to the damper plate 26 of the torque limiter 12 by means of the rivets 29, which are inserted through holes 40. These holes are provided for this purpose in the radial plate 14 of the primary coaxial part 11A, in line with the rivets 29.

FIG. 1 illustrates in phantom lines a modification in which the radius of the reaction plate 24 of the secondary coaxial part 11B stops short of the rivets 19 of the primary coaxial part 11A. In the assembly of this modified version, the first step is to secure the damper plate 26 of the torque limiter 12 on to the reaction plate 24 before the radial plate 15 of the primary coaxial part 11A is secured to the spacing flange 16. In this case, the holes 40 in the radial plate 14, in line with the rivets 29 of the secondary coaxial part 11B, are absent.

In all cases, and as explained above, the resiliently deformable rings 39 are compressed, i.e. prestressed, before being fitted.

In FIG. 3, the radial plate 15 of the primary coaxial part 11A is secured to the spacing flange 16 by welding, and the hub 20 is a separate component from the radial flange 14. In this case, the fitting operation is carried out using the second of the two assembly methods described above.

In all cases grease is introduced into the cavity 36. Also in every case, and as will be realised, the passage which is defined between the radial plate 15 and the hub element formed on the plate 24 at its inner periphery preferably has no need to be narrow.

The invention is of course not limited to the embodiments described above and shown in the drawings, nor to the fitting or assembly methods described above but embraces any modification of construction and/or combination of their various elements, within the limits of the following claims.

What is claimed is:

1. A torsion damper comprising: a primary part; a secondary part; means mounting the said primary and secondary parts coaxially with each other and for relative rotation of one with respect to the other, with at least one of the said coaxial parts partly defining a cavity therein; circumferentially acting resilient means arranged within the said cavity; a torque limiter coupled with the said resilient means and with the said coaxial parts whereby to couple the two coaxial parts operatively together; and sealing means partly defining the said cavity, the torsion damper including a unitary subassembly comprising the said torque limiter and sealing means, wherein the torque limiter comprises a damper plate secured to one of the said coaxial parts, a pair of counter plates in frictional embracing engagement with the said damper plate, and fastening means securing the said counter plates together and also securing the sealing means to the counter plates.

2. A torsion damper according to claim 1, wherein the said sealing means comprise at least one resiliently deformable ring, secured to the counter plates along one of said resiliently deformable ring peripheries and cantilevered from one of the counter plates and extending lengthwise of the other.

3. A torsion damper according to claim 2, wherein the said resiliently deformable ring is secured to the counter plates along said resiliently deformable ring outer circumference.

4. A torsion damper according to claim 2, wherein the said resiliently deformable ring is precompressed.

5. A torsion damper according to claim 2, wherein the said sealing means comprise two said resiliently deformable rings arranged on either side of the counter plates.

6. A torsion damper according to claim 1, wherein the torque limiter has friction surfaces outside the said cavity.

* * * * *